United States Patent [19]
Kuriyama et al.

[11] Patent Number: 5,075,849
[45] Date of Patent: Dec. 24, 1991

[54] INFORMATION PROCESSOR PROVIDING ENHANCED HANDLING OF ADDRESS-CONFLICTING INSTRUCTIONS DURING PIPELINE PROCESSING

[75] Inventors: Kazunori Kuriyama, Iruma; Yooichi Shintani, Hadano; Tohru Shonai, Hadano; Eiki Kamada, Hadano; Kiyoshi Inoue, Tokyo, all of Japan

[73] Assignee: Hitachi, Ltd., Tokyo, Japan

[21] Appl. No.: 292,346

[22] Filed: Dec. 30, 1988

[30] Foreign Application Priority Data

Jan. 6, 1988 [JP] Japan .................... 63-351

[51] Int. Cl.⁵ .................. G06F 9/28; G06F 9/30; G06F 9/38
[52] U.S. Cl. .................. 395/400; 364/231.8; 364/271.6; 364/228.7; 364/262.4; 364/263; 364/263.1; 364/263.2; 364/262.9; 364/DIG. 1
[58] Field of Search ... 364/200 MS File, 900 MS File

[56] References Cited

U.S. PATENT DOCUMENTS 4,123,795  10/1978  Dean, Jr. et al. ............ 364/200
4,445,177   4/1984  Bratt et al. .................. 364/200
4,789,925  12/1988  Lahti ......................... 364/200

Primary Examiner—Thomas C. Lee
Assistant Examiner—Daniel Pan
Attorney, Agent, or Firm—Antonelli, Terry, Stout & Kraus

[57] ABSTRACT

An information processor detects a conflict between successive instructions by determining whether a preceding instruction under execution calls for fetching a first operand from a main memory, generating execution result data based on the first operand and updating one of a plurality of address data designated by a to-be-executed succeeding instruction, with the execution result data. When a conflict is detected, there is supplied to an address adder at least some of the plurality of address data determined by a type of the preceding instruction to complete an operand address calculation stage for the succeeding instruction. Then, before the one address data is updated by the preceding instruction after the first operand has been fetched from the main memory in an operand fetch stage for the preceding instruction, an operation determined by the preceding instruction is performed on the output of the address adder and the fetched first operand to generate an address equal to a sum of the plurality of address data, excluding said one address, and the execution result data for the preceding instruction, and this address is used as the address of the second operand of the succeeding instruction.

12 Claims, 5 Drawing Sheets

|  | | OP | R1 | D | X | B |
|---|---|---|---|---|---|---|
| FIG. 3A | I₁ | LOAD | ③ | 12 | ( 4 , | 8 ) |
| | I₂ | ADD | 5 | 64 | (③, | 1 ) |

|  | | OP | R1 | D | X | B |
|---|---|---|---|---|---|---|
| FIG. 3B | I₁ | ADD | ③ | 12 | ( 4 , | 8 ) |
| | I₂ | LOAD | 5 | 64 | (③, | 1 ) |

|  | | OP | R1 | D | X | B |
|---|---|---|---|---|---|---|
| FIG. 3C | I₁ | LOAD HALF | ③ | 12 | ( 4 , | 8 ) |
| | I₂ | ADD | 5 | 64 | (③, | 1 ) |

|  | | OP | R1 | D | X | B |
|---|---|---|---|---|---|---|
| FIG. 3D | I₁ | SUB-TRACTION | ③ | 12 | ( 4 , | 8 ) |
| | I₂ | LOAD | 5 | 64 | (③, | 1 ) |

|  | | OP | R1 | D | X | B |
|---|---|---|---|---|---|---|
| FIG. 3E | I₁ | LOAD | ③ | 12 | ( 4 , | 8 ) |
| | I₂ | ADD | 5 | 64 | (③, | ③ ) |

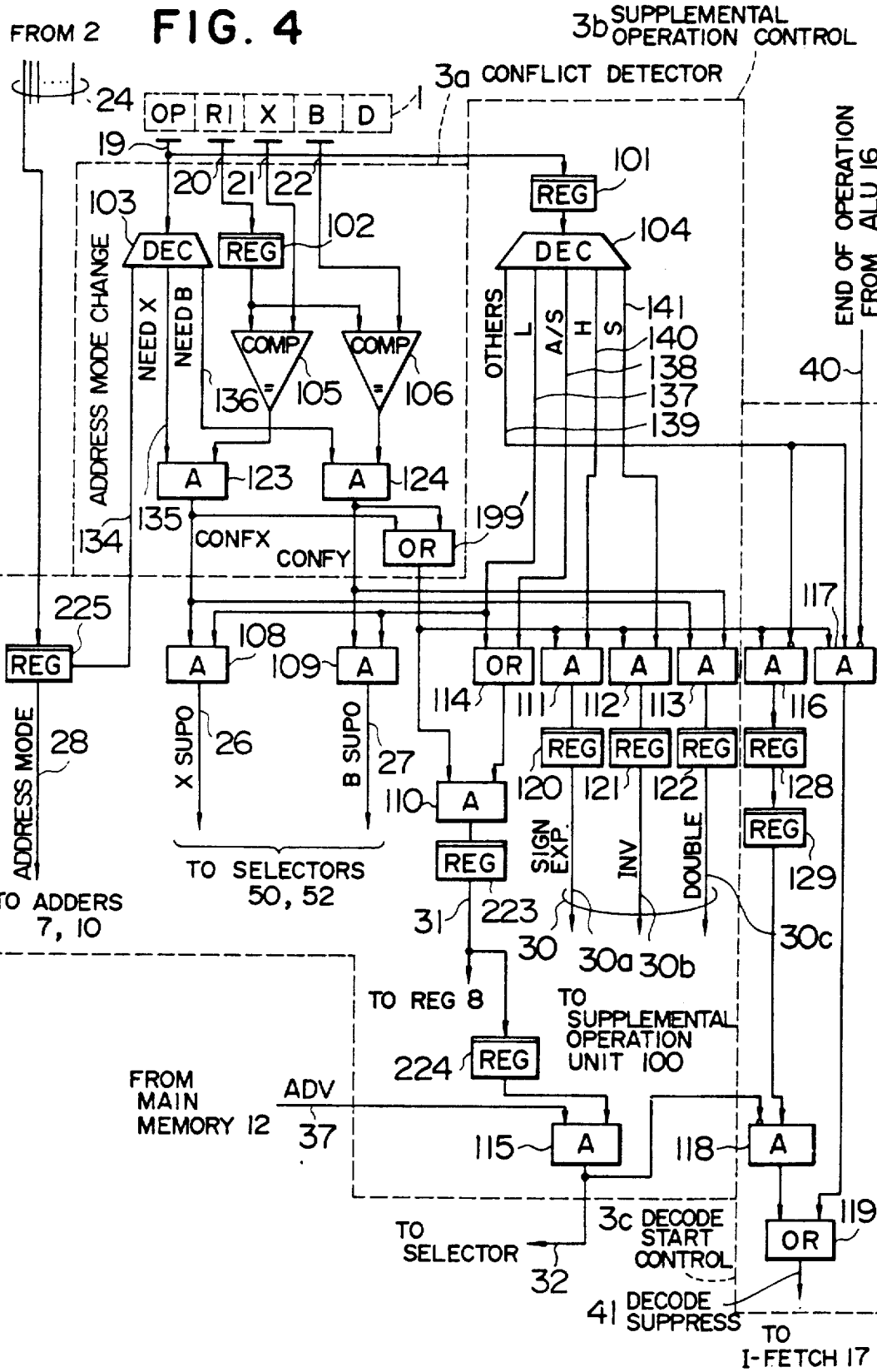

INFORMATION PROCESSOR PROVIDING ENHANCED HANDLING OF ADDRESS-CONFLICTING INSTRUCTIONS DURING PIPELINE PROCESSING

BACKGROUND OF THE INVENTION

The present invention relates to an information processor which executes instructions sequentially in a pipeline control system while attaining high speed execution by reducing disturbance in the pipeline.

In the pipeline control system, the execution of instructions is divided into a plurality of stages which are executed in an overlapped manner. FIG. 2A shows the execution in a prior art pipeline control system. D denotes an instruction word decoding stage, A denotes an operand effective address calculation stage, B denotes an operand fetching stage from a main memory, L denotes an operand transfer stage in which the operand fetched from the main memory is transferred to an operand buffer register, and E denotes an execution stage in which an operation inherent to an instruction is executed. The effective address in the stage A is calculated by adding contents of two general purpose registers designated by an index part and a base part of the instruction, respectively (which are called an index register and a base register, respectively) and a displacement which is a portion of the instruction.

In the pipeline control system, when the stage D for one instruction is completed, the stage A for that instruction is started and the stage D for the succeeding instruction is started at the same time. In this manner, a plurality of instructions are sequentially executed in an overlapped manner.

Where an instruction $I_1$ is to instruct to change a content of a general purpose register, for example, instruct to store an operation result in the general purpose register, and the immediately succeeding instruction $I_2$ is to designate the same general purpose register as the index register or base register in order to use the content thereof for generating an effective address, and if any high speed execution technique is not used, the effective address calculation stage A for the instruction $I_2$ must be started after the execution stage E for the instruction $I_1$ has been completed and the operation result has been stored in that general purpose register, as shown in FIG. 2A. As a result, there exists a three-cycle overhead as shown in FIG. 2A. Where the content of the general purpose register to be used to generate the effective address of the operand is changed by the preceding instruction, it is called an address conflict. Several methods for attaining high speed execution under the address conflict situation have been proposed.

FIG. 2B shows a method disclosed in JP-B-56-46170, in which high speed execution of a succeeding instruction $I_2$ is attained only when the instruction $I_1$ which changes the content of the general purpose register is a load-type instruction which instructs to load an operand from main memory into a general purpose register as it is. Specifically, the instruction $I_1$ is executed, the operand is fetched from the main memory and it is transferred to the operand buffer as well as to a register provided at an input of an address generating adder. Simultaneously with the above transfer, the execution of the effective address generation stage A for the succeeding instruction $I_2$ is started. In this manner, in parallel with the stage E for the instruction $I_1$ in which the operand is stored into the general purpose register designated by the instruction $I_1$, the stage A for the succeeding instruction $I_2$ is executed. As a result, the overhead is reduced to two cycles as shown in FIG. 2B.

In order to further improve the above method, Japanese patent application 61-191841 filed on Aug. 11, 1986, published as JP-A-63-47834, assigned to the assignee of the present invention and entitled "Instruction Processing Apparatus with Enhanced Execution of An Address-Conflicting Instruction" discloses a method to further accelerate the execution of the address conflict by a succeeding instruction when it meets a certain condition. Specifically, where the general purpose register the content of which is to be changed by the preceding instruction is designated as the index register by the succeeding instruction and the content of the base register designated by the succeeding instruction and the displacement designated by the instruction are both zero, or where the general purpose register the content of which is to be changed by the preceding instruction is designated as the base register by the succeeding instruction and the content of the index register designated by the succeeding instruction and the displacement designated by the instruction are both zero, the operand address needed by the succeeding instruction is equal to the operand itself written by the preceding instruction. Accordingly, in such a case, the address calculation for the succeeding instruction may be omitted to accelerate the execution of the succeeding instruction. Thus, the operand fetched from the main memory for the preceding instruction is transferred directly to the main memory referring address register, and the operand fetch stage L for the succeeding stage is executed based on that operand. As a result, the overhead is reduced to one cycle as shown in FIG. 2C.

In the prior art method shown in FIG. 2B, the high speed execution is attained only when the preceding instruction is a load-type instruction but it is not attained when the preceding instruction is an add instruction or subtract instruction.

In the method shown in FIG. 2C, the high speed execution is attained only when the content of the index register designated by the succeeding instruction and the displacement are both zero, or when the content of the base register and the displacement are both zero. The high speed execution is not attained when both of the index register and the base register designated by the succeeding instruction are used to generate the address. When the instruction which changes the content of the general purpose register is an add/subtract instruction, the operation by an operation unit is required and the overhead is increased by one cycle.

SUMMARY OF THE INVENTION

It is an object of the present invention to provide an information processor which attains high speed execution for not only a load-type instruction but also an add/subtract instruction in which a succeeding instruction conflicts with an instruction which requires execution of an operation, without requiring a special condition for contents of the index register and base register designated by the succeeding instruction.

In order to achieve the above object, the information processor of the present invention comprises; detection means for detecting whether a preceding instruction under execution instructs to fetch a first operand from a main memory, generate execution result data for the preceding instruction based on the first operand and change one of a plurality of address data designated by a succeeding instruction to be executed, with the execution result data;

address adder means responsive to a negative detection result of said detection means for adding the plurality of address data to generate a second operand address required by the succeeding instruction;

address data supply means responsive to an affirmative detection result of said detection means for supplying to said address adder means at least some of the plurality of address data determined by a type of the preceding instruction, in parallel to the execution of the preceding instruction; and operation means responsive to the affirmative detection result for performing, when the first operand for the preceding instruction is fetched from the main memory, an operation determined by the preceding instruction to an output of said address adder means prior to the change of said one address data by the preceding instruction and the fetched first operand to generate, as the second operand address, an address equal to a sum of the plurality of address data excluding said one address data and the execution result for the preceding instruction.

The circuit which detects the use of the content of the register to be changed by the preceding instruction for the address generation by the succeeding instruction renders the read data of that register to zero depending on the detection result so that the three-input address adder produces an interim sum of the address calculation. The register which holds the output of the three-input address adder holds the interim sum until the operand is fetched from the main memory by the preceding instruction, and they are operated in the operation means.

BRIEF DESCRIPTION OF THE DRAWINGS

FIG. 4 shows a circuit diagram of a control circuit 3 in FIG. 1.

DESCRIPTION OF THE PREFERRED EMBODIMENTS

The preferred embodiments of the present invention will now be explained with reference to the drawings.

Figure 1:
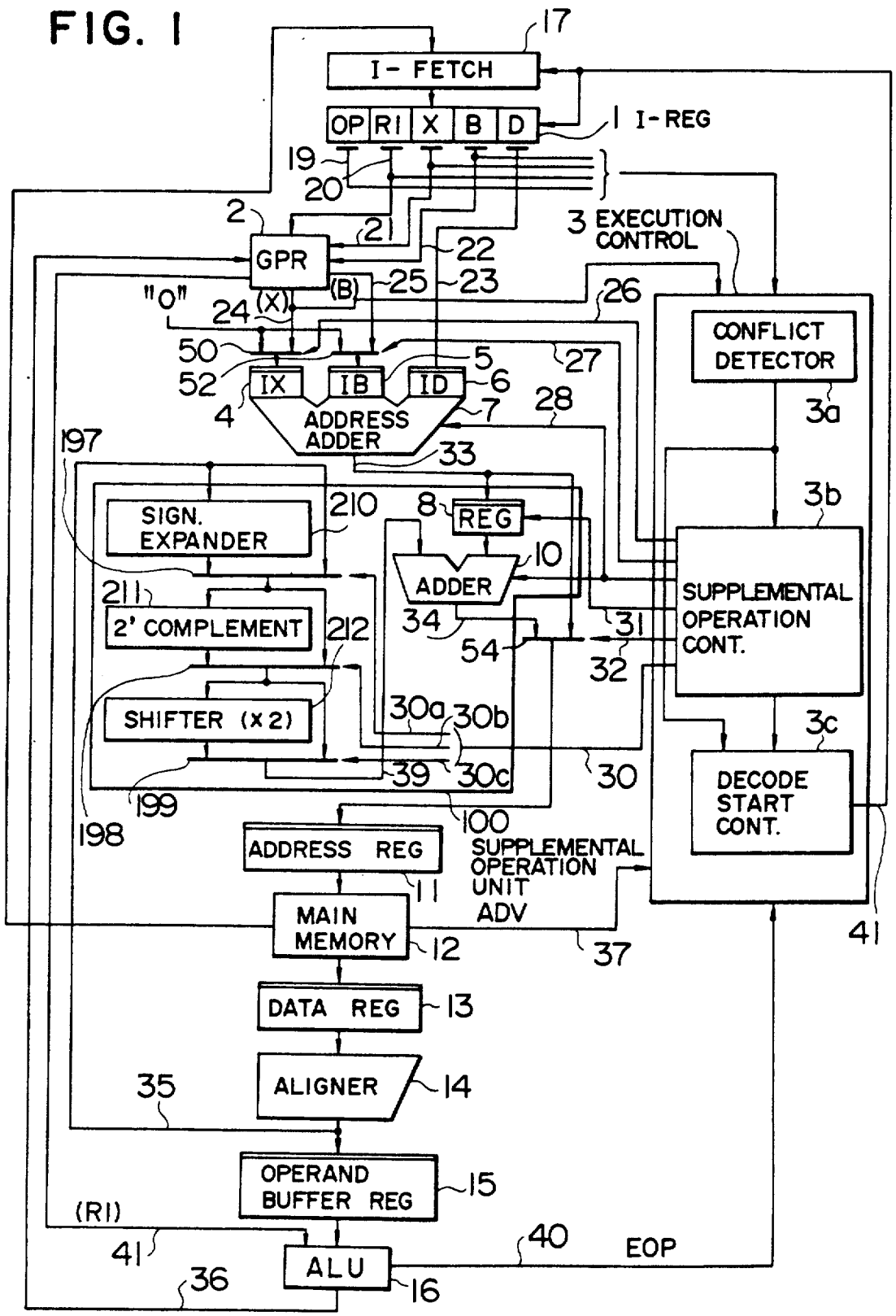
FIG. 1 shows an overall configuration of one embodiment of an information processor of the present invention.

FIG. 1 shows an overall configuration of the information processor of the present invention. Numeral 1 denotes an instruction register, numeral 2 denotes general purpose registers, numeral 3 denotes control circuit for controlling execution of an instruction in response to the instruction in the instruction register 1, numeral 7 denotes an address adder for generating an address of an operand to be fetched from a main memory 12 for the instruction, numeral 14 denotes an aligner for shifting the operand fetched from the main memory 12 by an appropriate number of bits and extracting an appropriate portion thereof, numeral 16 denotes an arithmetic and logic operation unit whose operation result is sent to the general purpose registers 2, and numeral 100 denotes an auxiliary operation unit newly provided in the present invention. The output of the aligner 14 and the output of the address adder 7 are supplied to the auxiliary operation unit 100 which calculates the operand address based on those two inputs and supplies it to an address register 11 through a selector 54. The output of the auxiliary operation unit is used to calculate, earlier than in the prior art, the operand address required by a succeeding instruction which is in an address-conflicting relation to a preceding instruction. Numeral 17 denotes an instruction fetch circuit for fetching instructions from the main memory 12 and for sequentially supplying them to the instruction register. FIGS. 3A to 3E show examples of instruction sequences which can be quickly executed in accordance with the present invention. A field OP indicates a type of operation, a field R1 indicates a general purpose register number to be used for a first operand, fields X and B indicate index register number and base register number which are designated by the instruction to fetch a second operand from the main memory, and a field D indicates a displacement designated by the instruction. The operand address to be fetched from the main memory is determined by a sum of the contents of the base register and the index register designated by the instruction and the displacement.

An overall flow in FIG. 1 is now explained for the execution of the instruction sequence shown in FIG. 3A. It is assumed that a load instruction $I_1$ has no address conflict to any preceding instruction. In the instruction sequence shown in FIG. 3A, the preceding instruction $I_1$ is the load instruction which loads the operand from the main memory 12 to the general purpose register #3. On the other hand, the succeeding instruction $I_2$ is an add instruction which designates the general purpose register #3 as the index register and the general purpose register #1 as the base register. Thus, the add instruction $I_2$ causes an address conflict with the preceding load instruction $I_1$ with respect to the general purpose register #3. In the prior art, the calculation of the address of the instruction $I_2$ (stage A) must be started after the completion of the loading of the operand required by the instruction $I_1$ into the general purpose register #3 (stage E). In the present embodiment, the instructions $I_1$ and $I_2$ of FIG. 3A are executed in the manner shown in FIG. 2C. The stage B to fetch the operand of the add instruction $I_2$ is executed in parallel to the stage E of the preceding load instruction. As a result, the delay of the execution of the instruction $I_2$ is only one cycle.

In FIG. 1, when the preceding load instruction $I_1$ is loaded into the instruction register 1, the operand required by the instruction is fetched from the main memory in accordance with a conventional procedure. Namely, the index register number X (=4) and the base register number B (=8) are sent to the general purpose registers 2 through lines 21 and 22, respectively. As a result, the contents X and B of the general purpose registers #4 and #8 are sent from the general purpose registers 2 to lines 24 and 25, respectively. The control circuit 3 comprises a conflict detector 3a, a supplemental operation control unit 3b and a decode start control 3c. When the conflict detector 3a does not detect a conflict to the instruction $I_1$, with supplemental operation control 3b responds to the instruction $I_1$ to control selectors 50 and 52 so that the data on the lines 24 and 25 are selected. Thus, the data are loaded into an index input register (IX) 4 and a base input register (IB) 5 of the three-input address adder 7, respectively.

On the other hand, a displacement D (= 12) which is a portion of the load instruction $I_1$ is supplied from the instruction register 1 to a displacement input register (ID) 6 of the address adder 7 through the line 23. As a result, the three-input address adder 7 adds the three inputs to calculate the address of the operand required by the load instruction $I_1$. The resulting address 33 is loaded into the address register 11 connected to the main memory through a selector 54. Since the load instruction does not conflict with the preceding instruction, the supplemental operation unit 3b commands by a select signal 32 to the selector 54 to select the output data 33 of the address adder 7. It accesses the main memory 12 by the operand address loaded in the address register 11 to fetch the operand of the load instruction $I_1$, and loads the fetched data into a data register 13. The aligner 14 may be a conventional one which extracts a necessary portion from the fetched data and aligns it for use in the operation. A circuit for controlling the aligner is also a conventional one and it is not shown for simplification purposes. The data loaded in the data register 13 is loaded into an operand buffer register 15 through the aligner 14, hence it is supplied to an arithmetic and logic operation unit 16, which performs an operation determined by the type of instruction. Since the load instruction needs no operation, the fetched data passes through the operation unit 16 and is sent to the general purpose registers 2 through a signal line 36 and is stored in the general purpose register #3 designated by the field R1 of the instruction.

On the other hand, the succeeding add instruction $I_2$ is extracted into the instruction register 1 by an instruction fetch circuit 17 when the address generation to the preceding load instruction $I_1$ is ready, that is, when the data for address calculation has been loaded into the index input register 4, the base input register 5 and the displacement input register 6. However, since the preceding load instruction $I_1$ is to change the content of the general purpose register #3 designated as the index register by the add instruction $I_2$, there exists an address conflict between those two instructions. The method disclosed in the U.S. patent application corresponding to the Japanese patent application 61-191841 is not applicable to such a case, because the content of the base register 1 which has no conflict to the preceding instruction $I_1$, and which is the general purpose register designated by the succeeding add instruction is not zero. In the present embodiment, it is assumed that the content of the base register #0 is always zero but the contents of other general purpose registers are not always zero. In the present invention, if the preceding information $I_2$ belongs to a predetermined group, the high speed execution is attained as described below.

When the conflict detector 3a detects the address conflict between the succeeding instruction and the preceding instruction, the supplemental operation control 36 operates in different manners depending on whether the succeeding instruction belongs to the predetermined group or not. If the succeeding instruction is one which requires only a simple operation, such as required by an add instruction or a load half instruction, the decode stage of the succeeding instruction $I_2$ is executed in the following manner. The contents of the general purpose registers #3 and #1 of the general purpose registers 2 designated by the add instruction $I_2$ as the index register and the base register, respectively, are read out to the lines 24 and 25. Since the content of the general purpose register #3 has not yet been updated by the preceding load instruction $I_1$, it cannot be used for the address calculation of the add instruction $I_2$, but the content of the base register designated by the add instruction $I_2$ and the displacement can be used for the address calculation. Thus, the supplemental operation control unit 3b controls the selector 50 through the signal line 26 so that the selector 50 selects "0" instead of the data sent to the line 24 from the general purpose register #3 which is designated as the index register and which has the conflict. The selector 52 selects the content of the base register on the line 25. The displacement designated by the add instruction $I_2$ is supplied to the address adder 7 as it is. As a result, the address adder 7 adds only the content of the general purpose register 1 designated as the base register by the add instruction $I_2$ and the displacement designated by the instruction. Instead of waiting in the three-input address adder 7 for the arrival of the operand produced by the execution of the preceding instruction as is done in the method of the Japanese patent application 56-46170, the incomplete address is first calculated based on portions of address data designated by the succeeding instruction $I_2$ and it is outputted. The incomplete address sent to the signal line 33 is loaded into the register 8 provided by the present invention to wait for the completion of fetching of the operand of the preceding instruction. On the other hand, the data fetched from the main memory 12 by the preceding load instruction $I_1$ is transferred to the operand buffer register 15 and also is supplied to the auxiliary operation unit 100 of the present invention through the signal line 35. For the load instruction $I_1$, the operation by the operation unit 16 is not required. Accordingly, the operand is identical to the data loaded in the general purpose register #3. Therefore, it may be used as the content of the base register of the add instruction $I_2$. The supplemental operation control 3b in the control circuit 3 controls the selectors 197 to 199 in the supplemental operation control 100 so that the data bypasses circuits 210 to 212, which are provided to attain high speed execution of other instructions as will be explained later. As a result, the adder 10 adds the incomplete address stored in the register 8 and the data fetched from the main memory 12 for the preceding instruction $I_1$. In this manner, the correct operand address of the add instruction $I_2$ is produced and it is sent to the signal line 34. In response to the end of fetch signal 37 produced at the end of fetching of the operand of the load instruction $I_1$ from the main memory 12, the supplemental operation control 3b controls the selector 54 through the control signal line 32 to select the output 34 of the operation unit 10 as the input to the address register 11. In this manner, the address of the add instruction $I_2$ is calculated and it is loaded into the address register 11. Thereafter, the operand is fetched from the main memory 12 and it is supplied to the operation unit 16, as is done for the load instruction $I_1$. For the add instruction $I_2$, unlike the load instruction $I_1$, the content of the general purpose register #5 designated by the field R1 of the add instruction I$_2$ is sent to the operation unit 16 through the line 41 and it is added to the operand fetched from the main memory 12 in the operation unit 16, and the sum is stored into the general purpose register #5 of the general purpose registers 2 designated by the field R1.

Figure 2A:
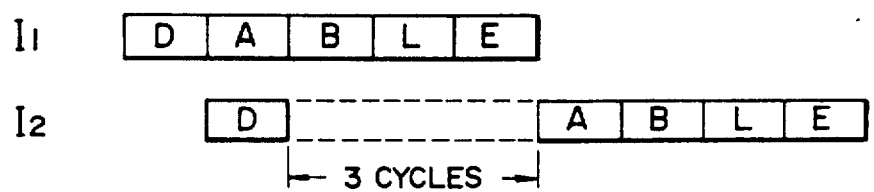
FIG. 2A shows a time chart of execution of two address-conflicting instructions in a prior art method.
Figure 2B:
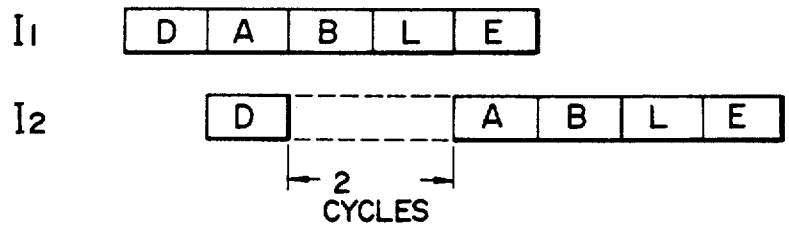
FIG. 2B shows a time chart of execution of the same two instructions as those of FIG. 2A, in another prior art method.

In order to execute the instruction sequence shown in FIG. 3A, the two-cycle overhead is included in the prior art execution method as shown in FIG. 2B. In the present invention, the address calculation (stage A) is performed by the address adder 7 independently from the execution of the preceding load instruction I$_1$, and then the address calculation is performed by the supplemental operation unit in parallel to the execution of the operation stage of the load instruction I$_1$ and the operand is fetched from the main memory (stage B). Accordingly, in the present invention, the overhead is reduced to one cycle.

A detail of the control circuit 3 is explained with reference to FIG. 4. The conflict detector 3a comprises a register 102, comparators 105 and 106, a decoder 103 and gates 123, 124 and 199'. The register 102 holds the general purpose register number R1 for the first operand of the instruction (preceding instruction) which has been held in the instruction register (FIG. 1) when the instruction (succeeding instruction) is loaded to the instruction register. The comparators 105 and 106 are 4-bit comparators. The comparator 105 compares the field R1 of the preceding instruction, that is, the general purpose register number R1 to be changed by the preceding instruction and the general purpose register number designated by the index register field of the instruction currently extracted into the instruction register 1, and if they are equal, it produces a "1" output. The comparator 106 compares the field R1 of the preceding instruction and the general purpose register number B designated by the base register field of the succeeding instruction, and if they are equal, it produces a "1" output. The decoder 103 decodes the OP code of the instruction currently loaded in the instruction register 1 to determine if the instruction requires the index register or the base register, and if the instruction requires the former, it sends a signal need X to a line 135, and if the instruction requires the latter, it sends a signal need B to a line 136.

The output line 135 of the decoder 103 and the output of the comparator 105 are supplied to an AND gate 123. When the content of the general purpose register to be changed by the instruction which precedes the instruction loaded in the instruction register 1 and the content of the index register designated by the instruction loaded in the instruction register 1 are equal, the output of the AND gate 123 is "1". Similarly, the output line 136 of the decoder 103 and the output of the comparator 106 are supplied to the AND gate 124, which produces a "1" output when the preceding instruction and the succeeding instruction are in the conflict relation with respect to the base register.

Accordingly, if one of the outputs of the AND gates 123 and 124 are "1", there exists an address conflict between the preceding instruction and the succeeding instruction. Since the OR gate 199' receives the outputs of the AND gates 123 and 124, the OR gate 199' produces a "1" output when there exists an address conflict.

The supplemental operation control logic 3b comprises a register 101, a decoder 104, gates 108–115 and registers 120–122 and 223–225.

The register 101 holds the OP code of the instruction (preceding instruction) which precedes to the instruction (succeeding instruction) currently loaded in the instruction register 1. The decoder 104 decodes the type of the preceding instruction. In the present embodiment, when the preceding isntruction is a load-type instruction, that is, when it is a load instruction or a load half instruction, a signal L is sent to a line 137. When the preceding instruction is an add instruction or a subtract instruction, a signal A/S is sent to a line 138. Particularly, when the preceding instruction is the subtract instruction, a signal S is sent to a line 141. When the preceding instruction is an instruction for processing a half word such as load half, add half or substract half instruction, a signal H is sent to a line 140. When the preceding instruction is an instruction other than the load-type instruction, add instruction and subtract instruction, for example, a multiply instruction, a signal OTHERS is sent to a line 139.

The gates 108–115 and the registers 120–122 and 223–225 control the execution of the succeeding instruction having, a conflict, with the preceding instruction depending on the type of the preceding instruction.

The decode start control 3c controls the start of decoding of the instruction loaded in the instruction register 1.

The operation of the circuit of FIG. 4 is now explained with respect to an execution of the add instruction I$_2$ following a load instruction I$_1$ in FIG. 3A.

Assuming that there is no address conflict between the preceding load instruction I$_1$ and a further preceding instruction, the outputs of the AND gates 123 and 124 are both "0", and the outputs XSUPO and BSUPO of the AND gates 108 and 109 are both "0". Accordingly, the selectors 50 and 52 of FIG. 1 select the output lines 24 and 25 of the general purpose registers 2, respectively. In this manner, the load instruction is normally executed. When the succeeding add instruction I$_2$ is loaded into the instruction register 1, the decoder 103 sends signals need X and need Y which indicate the need for the index register and the base register, to the AND gates 123 and 124 through the signal lines 135 and 136, respectively. On the other hand, when the decoder 104 decodes the content of the register 101 which holds the OP code of the preceding load instruction I$_1$, it sends a signal L indicative of the decoding of the load instruction I$_1$, to the AND gates 108 and 109 through a line 137. The comparators 105 and 106 compare the general purpose register numbers X (=3) and B (=1) designated by the add instruction I$_2$ as the index register and the base register with the general purpose register number R1 (=3) into which the operand is loaded by the preceding load instruction. The index register number X (=3) of the add instruction is supplied to the comparator 105 through a signal line 132, and the base register number B (=7) is supplied to the comparator 106 through a signal line 133. On the other hand, the general purpose register number R1 which is to be changed by the load instruction is supplied from the register 102 to the two comparators 105 and 106. Since there exists an address conflict with respect to the index register, the output of the comparator 105 is "1", which is sent to the AND gate 123. Accordingly, the output XSUPO of the AND gate 108 is "1". On the other hand the outputs of the AND gates 124 and 109 remain "0".

The signal XSUPO is sent to the selector 50 (FIG. 1) through a line 26 so that the selector 50 is controlled to select zero as the input data to the index input register 4 of FIG. 1 as described before. As a result, the three-input address adder 7 adds the content of the base register designated by the instruction $I_2$ and the displacement. The AND gate 109 of FIG. 4 produces a "1" output signal BSUPO when the preceding instruction is the load instruction and the succeeding instruction requires the base register for the address calculation and the general purpose register number to be changed by the preceding instruction is equal to the base register number. The selector 52 (FIG. 1) is controlled so that it selects zero for the base input register 5 and the three-input address adder 7 (FIG. 1) adds only the content of the index register and the displacement.

In FIG. 4, the signal L which is produced when the instruction decoded by the decoder 104 is the load-type instruction and the signal A/S which is produced when the decoded instruction is the add-type or subtract-type instruction are supplied to the OR gate 114. Since a preceding instruction is the load instruction and the signal L is produced by the decoder 104, the output of the OR gate 114 is "1". If one of the output signals of the AND gates 123 and 124 is "1", the output of the OR gate 199' is "1". Accordingly, the output of the AND gate 110 to which the outputs of the OR gates 199 and 114 are supplied is "1", which is loaded into the register 223, which functions to adjust timing. The output signal 31 thereof causes the register 8 of FIG. 1 to read the output data of the three-input address adder 7. The register 8 holds the content of the index register supplied from the three-input address adder 7, that is, the incomplete address which does not contain the content of the base register. The output 31 of the register 223 of FIG. 4 is supplied to a timing adjust register 224, and the output thereof is supplied to the AND gate 115.

When the AND gate 115 receives a signal ADV indicating the end of operand fetching of the preceding load instruction from the main storage 12 through the signal line 37, the output 32 of the AND gate 115 is rendered "1". This signal commands to the selector 54 of FIG. 1 to select the output of the supplemental operation unit 100. The outputs of the AND gates 111–113 remain "0" for the case of FIG. 3A, those outputs are sent to lines 30a–30c through the registers 120–122. Those signals command the selectors 197–199 of FIG. 1 select the outputs of other than the circuits 210–212.

The decode start controller 3b of FIG. 4 suppresses the decoding of the instruction following to the instruction which has caused the address conflict. In the case of the address conflict, the OR gate 199' supplies a signal 1 to the AND gate 116, which also receives the inversion of the signal OTHERS from the decoder 104. When the preceding instruction is the load instruction as shown in FIG. 3A, the signal OTHERS is "0" and the output of the AND gate 116 is "1". This output is supplied to the AND gate 118 two cycles later through two registers 128 and 129. The AND gate 118 produces a signal 41 which suppresses the decoding of the further succeeding instruction two cycles after the decoding of the succeeding instruction $I_2$. This signal is supplied to the I-fetch circuit 17 and the instruction register 1 (FIG. 1). When the signal ADV is supplied from the main memory 12, the decode suppress signal 41 is reset by the AND gates 115 and 118.

The operation of the information processor of FIG. 1 when the instruction sequence of FIG. 3B is executed is now explained. In the present instruction sequence, the preceding instruction is an add instruction $I_1$ and the succeeding load instruction uses the general purpose register #3 to be changed by the add instruction $I_1$, as the index register. The preceding add instruction $I_1$ causes the operation unit 16 to add the content (GPR3) of the general purpose register #3 designated by the field $R_1$ of the instruction and the operand (OP2) in the main memory, and requests it to store the sum into the general purpose register #3. Accordingly, the present embodiment is different from FIG. 3A in that the preceding instruction $I_1$ requires the operation by the operation unit 16. When the succeeding load instruction $I_2$ is loaded into the instruction register 1 after the decoding of the preceding add instruction $I_1$, the information processor of FIG. 1 operates in the following manner.

If the preceding instruction $I_1$ is an add instruction, the operand address of the succeeding load instruction $I_2$ is the sum of the general purpose register #3 (GPR3) before it is updated by the add instruction $I_1$, the second operand (OP2) in the main memory 12 designated by the add instruction $I_1$, the content (GPR1) of the general purpose register #1 designated as the base register by the load instruction $I_2$ and the displacement (D) designated by the instruction, that is, (GPR3)+(OP2)+(GPR1)+D. An interim sum of the operand address of the load instruction $I_2$ is calculated while the second operand data (OP2) of the add instruction $I_1$ has not yet been fetched from the main memory 12. Three data GPR3, GPR1 and D are added while using the content (GPR3) of the general purpose register #3 before it is changed by the add instruction, to determine an incomplete address. When the second operand (OP2) of the add instruction $I_1$ is fetched from the main memory 12, it is added to the incomplete address by the supplemental operation unit 100 to determine a complete address. Thus, the decode stage for the succeeding load instruction $I_2$ can be executed without waiting for the completion of the execution of the preceding add instruction $I_1$. The content of the general purpose register #3 designated as the index register by the load instruction $I_2$, the content of the general purpose register #1 designated as the base register, and the displacement D designated by the instruction $I_2$ are added by the three-input address adder 7 which calculates the incomplete address. When the preceding instruction is a load instruction (FIG. 3A), it is necessary to render the index input register or the base input register to zero, but such a step is not necessary when the preceding instruction is an add instruction. The supplemental operation unit 36 in the control circuit 3 sends "0" to the signal lines 26 and 27 to cause the selectors 50 and 52 to select the output lines 24 and 25 of the general purpose registers 2.

The operation of the conflict detector 3c of FIG. 4 is same as that for the instruction sequence of FIG. 3A. The outputs of the AND gate 123 and the OR gate 199' are "1".

Since the preceding instruction decoded by the decoder 104 is an add-type instruction, the decoder 104 sends the signal A/S to the signal line 138 but it does not send the signal L to the signal line 137. As a result, the output of the AND gate 108 remains "0" as opposed to the case of FIG. 3A. The output of the AND gate 109 remains "0" as it does in the case of FIG. 3A. The outputs XSUPO and BSUPO of the AND gates 108 and 109 are supplied to the selectors 50 and 52 (FIG. 1) through the lines 26 and 27. The sum (GPR3)+(GPR1)+D by the address adder 7 of FIG. 1 is loaded into the register 8. A set signal 31 to the register 8 is generated by the control circuit in the following manner. In FIG. 4, since the output signal A/S of the decoder 104 is "1", the output of the OR gate 114 is also "1" as it is in the case of FIG. 3A. Accordingly, the output 31 of the register 223 is "1" as it is in the case of FIG. 3A.

In this manner, the addition in the address adder 7 is performed in the same manner as that where no conflict exists. The subsequent operation the same as that for the instruction sequence of FIG. 3A. When the fetching of the operand (OP2) of the preceding add instruction $I_1$ has been completed, the fetched data (OP2) is supplied to the supplemental operation unit 100 through the signal line 35. The selectors 197-199 of the supplemental operation unit 100 select the fetched data and supply it to the adder 10, which adds it to the incomplete address (GPR3)+(GPR1)+D held in the register 8. On the other hand, when the end signal ADV for the operand fetching of the add instruction $I_1$ is supplied to the control circuit 3 through the signal line 37, the control circuit 3 controls the selector 54 by the signal 32 so that the selector 54 selects the output of the adder 10. Thus, the operand address of the load instruction $I_2$ is loaded into the address register 11. The operand of the load instruction $I_1$ in the main memory 12 can thus be fetched.

As a result, even when there exists an address conflict with a preceding add instruction, the execution of the succeeding instruction can be accelerated.

Now, let us assume a case where the preceding instruction is a general purpose register change instruction which handles a half-word operand such as a load half instruction $I_1$, and the succeeding add instruction $I_2$ has an address conflict with the preceding instruction, as shown in FIG. 3C.

Figure 5A:
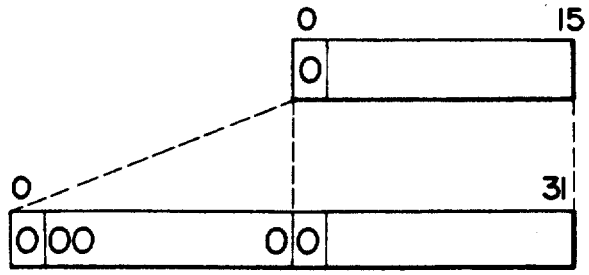
FIG. 5A shows a code expansion method for a half-word operand when a code bit is "0"
Figure 5B:
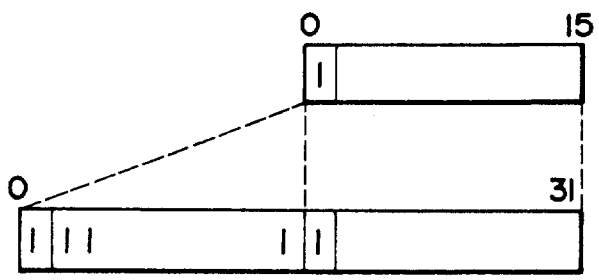
FIG. 5B shows a code expansion method for the half-word operand when the code bit is "1"

The operation is different from that for the instruction sequences of FIGS. 3A and 3B in that the operand (OP2) designated by the load half instruction $I_1$ is fetched from the main memory 12 to the adder 10 through a sign expander 210. The load instruction and add instruction shown in FIGS. 3A and 3B handle 4-byte data as the operand, and the data fetched from the main memory and the addition are of 4-byte length. On the other hand, the load half instruction $I_1$ shown in FIG. 3C fetches 2-byte data from a main memory 12 and loads it into the 4-byte general purpose register #3 designated by the field R1. The loading bit of the 2-byte data fetched from the main memory 12 is regarded as a sign bit, and the sign bit is expanded into a high order two bytes by the operation unit 16 to form 4-byte data. Then, it is loaded into the general purpose register #3. The operation to be performed by the operation unit 16 is, therefore, different from the addition which is performed for the instruction sequence of FIG. 3A. Specifically, if the loading bit of the 2-byte data is "0", "0" bits are filled in the high order two bytes (FIG. 5A), and if it is "1", "1" bits are filled (FIG. 5B).

For the instruction sequence of FIG. 3C, the decoding of the load half instruction $I_1$, the calculation of the operand address and the fetching of the operand are conducted in the same manner as that for the load instruction of FIG. 3A. When the succeeding add instruction $I_2$ is loaded in the instruction register 1, there exists a conflict with respect to the index input register as it does in FIG. 3A and the input data to the index input register 4 is rendered zero in the calculation of the operand address of the add instruction $I_2$ as is done in FIG. 3A. The incomplete address is held in the register 8 (FIG. 5) until the fetching of the operand of the load half instruction $I_2$ is completed. When the operand of the load half instruction $I_2$ is fetched, the operand address of the add instruction $I_2$ is calculated by the supplemental operation unit 100. In this case, it is necessary to expand the 2-byte operand data into 4 bytes. This is done by a sign expander 210. The 2-byte operand fetched by the load half instruction is aligned by the aligner 14 at a low order 2-byte position of a 4-byte data path 35. The sign expander 210 checks the most significant bit and adds 16 bits consisting of the same value as the sign bit to the high order position of the original 2-byte data. The expanded data is selected by the selector 197 and it is supplied to the adder 10 through the selectors 198 and 199. In this manner, when the preceding instruction is a load half instruction, the address of the succeeding add instruction can be correctly determined. The selector 197 selects the expanded data when the supplemental operation control 3b supplies the "1" control signal 30a to the selector 197. This control signal is generated in the following manner. In FIG. 4, when the preceding instruction is a half-word handling instruction, the decoder 104 supplies a signal H to the AND gate 111 through the signal line 140. Since "1" signal is supplied to the AND gate 111 from the OR gate 199', the AND gate 111 produces the "1" output, which is sent to the line 30a through the timing adjust register 120.

When the preceding general purpose register change instruction is an add half instruction which requires addition of a half-word operand, both the operation of the adder 7 explained in connection with FIG. 3B and the operation of the sign expander explained in connection with FIG. 3C are performed.

The operation for the instruction sequence of FIG. 3D is now explained, In this case, the preceding general purpose register change instruction $I_1$ is a subtract instruction. The general purpose register number (3) to be changed by the subtract instruction $I_1$ and the index register number of the succeeding load instruction $I_2$ are equal and there exists a conflict. The operand address designated by the load instruction $I_2$ is (GPR3)−(OP2)+(GPR1)+D where the symbols are same as those used for FIG. 3A. Like the case of FIG. 3B, three data excluding the second operand (OP2) of the subtract instruction $I_1$ are added, that is, (GPR3)+(GPR1)+D. When the second operand (OP2) of the subtract instruction $I_2$ is fetched, it is subtracted from the sum to calculate the operand address of the load instruction $I_2$. Accordingly, like the case of FIG. 3B where the preceding instruction is the add instruction, the content (GPR3) of the general purpose register #3 before it is changed by the subtract instruction, the content (GPR1) of the general purpose register #1 designated as the base register by the load instruction, and the displacement (D) are added by the address adder 7 to calculate the incomplete address for the load instruction $I_2$, and it is held in the address register 8 until the operand (OP2) of the subtract instruction $I_1$ is fetched. For the add instruction, the operand data (OP2) fetched from the main memory 12 is simply added by the adder 10. For the subtract instruction $I_1$, however, it must be subtracted. The subtraction is usually performed by addition using 2's complement. In the present embodiment, instead of subtracting the second operand (OP2) of the subtract instruction fetched onto the signal line 35, from the sum (GPR3)+(GPR1)+D held in the register 8, a 2's complement of the data on the signal line 35 is generated by a 2's complement circuit 211 and it is selected by the selector 198 and supplied to the adder 10. It is then added to the content held in the register 8 to attain the same result as the subtraction. The signal 3b which controls the selector 198 is generated in the following manner. In FIG. 4, when the decoder 104 decodes the preceding subtract instruction $I_1$, it supplies a signal S to the AND gate 112 through the line 141. Since the "1" signal is also supplied to the AND gate 112 from the OR gate 199, the AND gate 112 produces the "1" output, which is supplied to the selector 198 (FIG. 1) through the timing adjust register 121 and the line 30b.

Figure 2C:
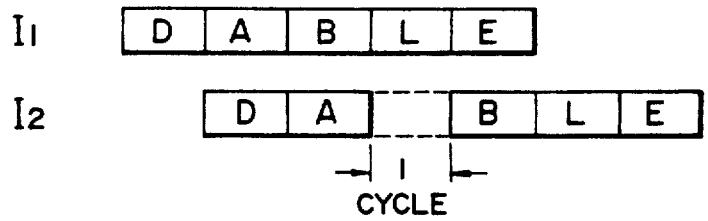
FIG. 2C shows a time chart of execution of the same two instructions as those of FIG. 2A in the processor of FIG. 1, FIGS. 3A to 3E show different instruction sequences which are objects of high speed execution by the present invention.

In this manner, when the preceding instruction is a subtract instruction, the overhead is reduced to one cycle as it is for the load instruction or add instruction, as shown in FIG. 2C. In FIG. 3D, when the subtract instruction $I_1$ is a subtract half instruction which handles a half-word operand, the selectors 197 and 198 are controlled so that both the output of the code expander 210 and the output of the 2's complement circuit 211 are selected as shown in FIG. 1. Thus, the present embodiment is applicable to such an instruction.

The operation for the instruction sequence shown in FIG. 3E is now explained. The combination of the instructions is same as that of FIG. 3A, but the general purpose register changed by the load instruction $I_1$ is designated by the succeeding add instruction $I_2$ as both the index register and the base register, unlike the case of FIG. 3A. The prior art is silent about the high speed execution in such a case. In accordance with the present invention, the execution is accelerated as it is for the instruction sequences of FIGS. 3A–3D.

The operand address of the succeeding add instruction $I_2$ can be determined by (OP2)+(OP2)+D based on the second operand data (OP2) of the preceding load instruction $I_1$ and the displacement (D) designated by the load instruction $I_2$. Namely, the second operand (OP2) of the load instruction $I_1$ fetched from the main memory 12 is doubled and it is added to the displacement (D). The selectors 50 and 52 are controlled so that the input to the index input register and the input to the base input register of the address adder 7 are rendered zero. The signals 26 and 27 which control the selectors 50 and 52 are supplied from the AND gates 108 and 109 of FIG. 4. When the second operand (OP2) of the load instruction $I_2$ is subsequently fetched, the operand is doubled by a shifter 212, and the output thereof is selected by the selector 199 and it is added to the content of the register 8 by the adder 10 so that the correct operand address of the add instruction $I_2$ is determined. The shifter 212 may be a simple one-bit left shifter. The selector 199 is controlled by the signal 30c which is generated by the AND gate 113 of FIG. 4. The AND gates 123 and 124 produce "1" outputs when the index register conflict and the base register conflict exist, respectively, as described before. For the instruction sequence of FIG. 3E, the output of the AND gate 113 is "1", which is supplied to the line 30c through the timing adjust register 122.

In this manner, when the register changed by the preceding load instruction is used for both the index register and the base register of the succeeding instruction, the overhead is reduced to one cycle as shown in FIG. 2C. This is not limited to the preceding load instruction but the present embodiment is equally applicable to the add instruction and the subtract instruction.

Figure 6A:
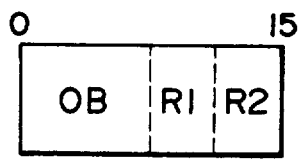
FIGS. 6A and 6B show different instruction formats for an address mode change instruction.
Figure 6B:
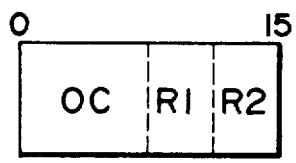

A latch 225 shown in FIG. 4 is used to designate an address mode in which a bit width of the operand address for referring the main memory 12, supplied from the address adder 7 is determined. When the output signal 28 of the latch 225 is "0", the address is of 24-bit width, and when the output signal 28 is "1", the address is of 31-bit width. As a result, the main memory 12 can be referenced by either 24-bit address or 31-bit address. The latch 225 is set or reset when the decoder 103 decodes an instruction which changes the address mode. FIGS. 6A and 6B show examples of an instruction which changes the address mode. 'OB' and 'OC' denote operation codes. Those instructions are 2-byte, instructions, and the bit 0 of the general purpose register designated by the field R2 indicates the address mode. When the decoder 103 decodes the instruction of FIG. 6A or 6B, the bit 0 of the general purpose register designated by the field R2, on the signal line 24 is set into the latch 225. The output signal 28 thereof suppresses the output data of the three-input address adder 7. According to the feature of the present invention on the address mode, the output signal 28 of the address mode control latch 225 controls not only the three-input address adder 7 but also the output of the adder 10. By reflecting the address mode to the output data of the adder 10 by the output signal 28 of the latch 225, the address conflict can be processed rapidly even immediately after the change of the address mode.

If the address mode control by the signal line 28 is not effected to the output of the adder 10, the operand data of the preceding instruction fetched from the main memory 12 cannot be supplied to the adder 10 and it must be supplied via the three-input adder 7 or the general purpose registers 2. As a result, the overhead will be increased by one or two cycles.

In accordance with the present invention, when there exists a address conflict with a preceding load-type instruction or add/subtract-type instruction, the decoding of the succeeding instruction can be accelerated without imposing any condition on the succeeding instruction. When the preceding instruction handles a half-word operand or when the index register and the base register of the succeeding instruction are concurrently changed by the preceding instruction, high speed execution is still attained.

We claim:

1. An information processor comprising:
    detection means responsive to a succeeding instruction to be executed for detecting whether there is a preceding instruction under execution which calls for fetching a first operand from a main member to be used to generate execution result data for the preceding instruction and for updating one of a plurality of address data designed by the succeeding instruction with execution result data obtained by said information processor during processing of the preceding instruction;
    address adder means responsive to a negative detection result of said detection means for adding a plurality of address data to generate a second operand address required by the succeeding instruction;
    address data supply means responsive to an affirmative detection result of said detection means for supplying to said address adder means at least part of the plurality of address data designated by said succeeding instruction as determined by a type of the preceding instruction, in parallel to the execution of the preceding instruction; and operation means responsive to the affirmative detection result for performing, when the first operand for the preceding instruction is fetched from the main memory and prior to the updating of said one address data by the preceding instruction, an operation determined by the preceding instruction on an output of said address adder means and the fetched first operand for the preceding instruction to generate, as the second operand address for the succeeding instruction, an address equal to a sum of the plurality of address data excluding said one address data and the execution result data for the preceding instruction.

2. An information processor according to claim 1 wherein said address data supply means includes a plurality of registers, and means responsive to the affirmative detection result of said detection means for supplying to said address adder means the address data held in an index register and a base register of the plurality of registers designated by the succeeding instruction and at least a portion of a displacement designated by the succeeding instruction as determined by the preceding instruction.

3. An information processor according to claim 1 wherein said address data supply means includes means responsive to the detection that the preceding instruction is a first type instruction requesting use of the first operand as it is as the execution result data for the preceding instruction for supplying the address data excluding said one address data to said address adder means, and said operation means includes means responsive to the detection that the preceding instruction is the first type instruction for calculating a sum of the fetched first operand and the output of said address adder means.

4. An information processor according to claim 1 wherein said address data supply means includes means responsive to the detection that the preceding instruction is a second type instruction requesting to expand a sign bit of the second operand and use the result thereof as execution result data for the preceding instruction for supplying the address data excluding said one address data to said address adder means, and said operation means includes sign expander means responsive to the detection that the preceding instruction is the second type instruction for expanding the sign bit of the fetched first operand, and means for calculating a sum of the output of said sign expander means and the output of said address adder means.

5. An information processor according to claim 1 wherein said address data supply means includes means responsive to the detection that the preceding instruction is a predetermined instruction for supplying all of the plurality of address data to said address adder means in parallel to the execution of the preceding instruction.

6. An information processor according to claim 5 wherein said predetermined instruction is one requesting to generate a sum of said one address data and the first operand as the execution result data and update said one address data by the result thereof, and said operation means includes means for generating a sum of the output of said address adder means and the first operand fetched from the main, memory as the address of the second for said succeeding instruction.

7. An information processor according to claim 5 wherein said predetermined instruction is one requesting to expand the sign bit of the first operand, generate a sum of the expanded first operand and said one address data as the execution result data and update said one address data with the execution result data, and said operation means includes sign expander means for expanding the sign bit of the first operand fetched from said main memory and means for generating a sum of the output of said sign means expander unit and the output of said address adder means as the address of the second operand for said succeeding instruction.

8. An information processor according to claim 5 wherein said predetermined instruction is one requesting to generate a difference between said one address data and the first operand as the execution result data and update said one address data with the execution result data, and said operation means includes means for generating a difference between the output of said address adder means and the first operand fetched from said main memory as the address of the second operand.

9. An information processor according to claim 5 wherein said predetermined instruction is one requesting to expand the sign bit of the first operand, generate a difference between said one address data and the expanded first operand as the execution result data and update said one address data with the execution result data, and said operation means includes sign expander means for expanding the sign bit of the first operand and means for generating a difference between the output of said address adder means and the output of said sign expander means as the address of the second operand for said succeeding instruction.

10. An information processor according to claim 1 wherein said operation means includes sign expander means responsive to the detection that the preceding instruction is one requesting to expand a sign bit of the first operand and generate the execution result data for the preceding instruction based on the expanded first operand for expanding the sign bit of the first operand fetched from said main memory, and means for performing an operation determined by the preceding instruction to the output of said sign expander means and the output of said address adder means to generate the address of the second operand for said succeeding instruction.

11. An information processor according to claim 1 wherein said address data supply means includes means responsive to the detection that the preceding instruction is one requesting to use the first operand as it is as the execution result data for the preceding instruction and further responsive to the detection by said detection means that two of the plurality of address data are to be updated by the execution result data for the preceding instruction for supplying the plurality of address data excluding said two address data to said address adder means, and said operation means includes means for doubling the first operand fetched from said main memory and means for generating a sum of the output of said doubling means and the output of said address adder means as the address of the second operand for said succeeding instruction.

12. An instruction execution method in an information processor for executing instructions each in a plurality of stages with different stages of different instructions being executed in parallel, comprising the steps of:

detecting whether a preceding instruction under execution instructs to fetch a first operand from a main memory, generate execution result data based on the first operand and update one of a plurality of address data designated by a to-be-executed succeeding instruction with the execution result data;

responsive to an affirmative detection result, supply to an address adder at least some of the plurality of address data determined by a type of the preceding instruction to complete an operand address calculation stage for the succeeding instruction; and before said one address data is updated by the processing of the preceding instruction after the first operand has been fetched from said main memory in an operand fetch stage for the preceding instruction, performing an operation determined by the preceding instruction on the output of said address adder and the fetched first operand for the preceding instruction to generate an address equal to a sum of the plurality of address data excluding said one address and the execution result data for the preceding instruction as the address of the second operand for said succeeding instruction.

* * * * *